Jan. 3, 1967  F. ADAMS  3,295,636
BRAKE MECHANISM
Filed Nov. 23, 1964  2 Sheets-Sheet 1

INVENTOR.
FRED ADAMS
BY D. D. McGrant
ATTORNEY

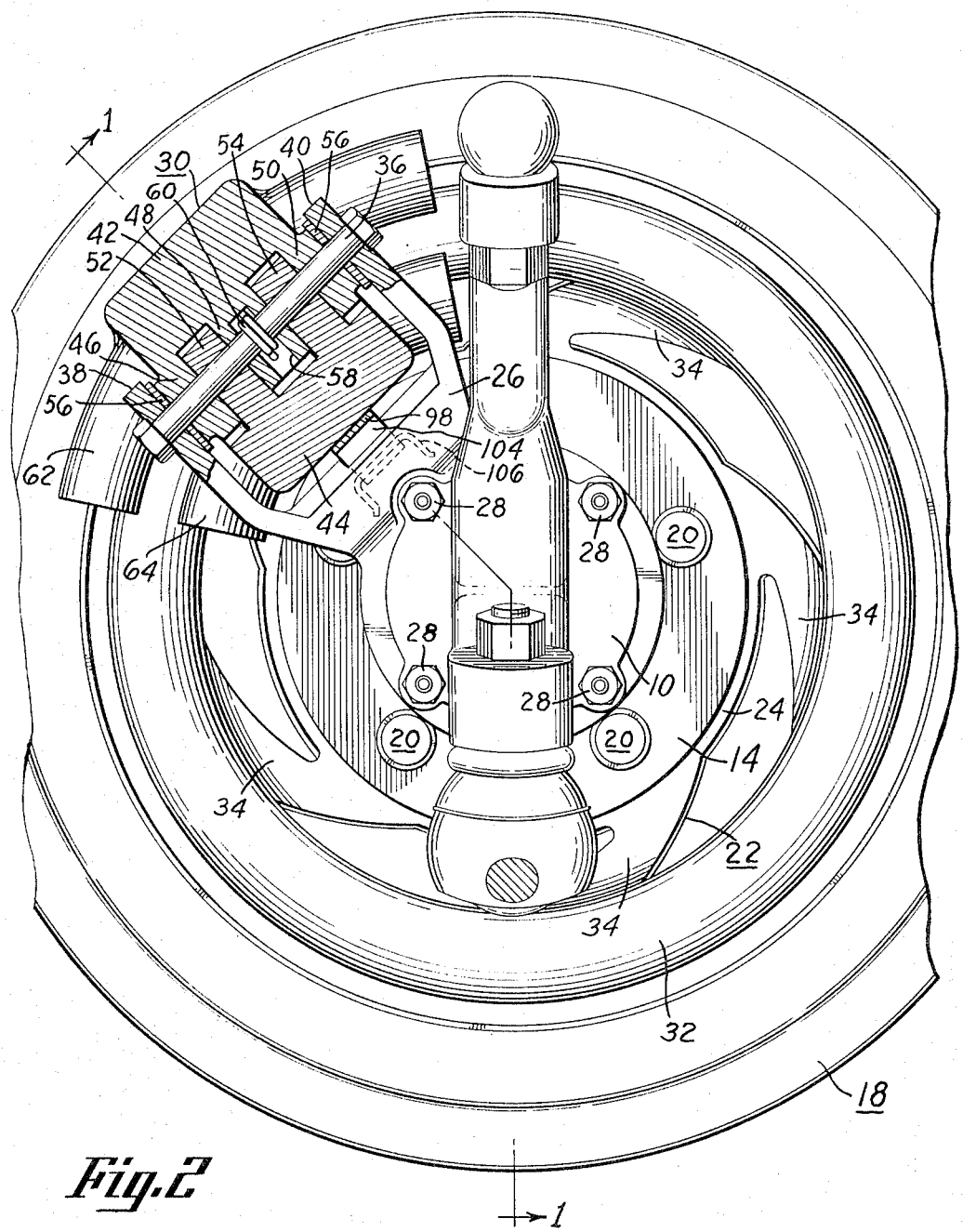

3,295,636
BRAKE MECHANISM
Fred Adams, Clawson, Mich., assignor to General Motors Corporation, Detroit, Mich., a corporation of Delaware
Filed Nov. 23, 1964, Ser. No. 412,999
10 Claims. (Cl. 188—18)

The invention relates to a brake mechanism particularly adapted for motor vehicles, and especially to one of the caliper disc brake type wherein the caliper assembly is a fluid pressure actuated pivotal double jaw or scissors arrangement and the friction surface portion of the disc has a toroidal cross section. It is well known to provide disc brakes with friction pads which act on a flat or substantially flat surface or surfaces of a disc. However, such discs require either substantial axial or radial space to obtain sufficient effective braking area. In many installations it is desirable to obtain as much effective braking area in the disc as possible within a minimum space. The space requirements are often limited axially as well as radially of the disc. It is therefore proposed to provide a toroidally shaped friction surface member which is herein referred to as a disc because of its general similarity to known brakes commonly referred to as disc brakes. The structure embodying the invention also includes a caliper assembly having friction pads which mate with the toroidal friction surface member. The caliper assembly includes a novel initial adjusting arrangement for proper positioning of the caliper jaws in the neutral position as well as for clearance adjustment of the friction pads. As a further improvement, the caliper mechanism includes a piston and cylinder arrangement wherein the piston is guided interiorly and exteriorly of the cylinder to provide a cylinder cap and also to provide a piston and cylinder abutment arrangement which precisely establishes the full retraction position of the piston from which position the brake is actuated and therefore from which position the caliper adjustments are made. The caliper assembly includes a novel mounting arrangement and centering spring mechanism which is a part of the caliper initial adjustment mechanism.

In the drawings:

FIGURE 2 is an elevation view of the inner side of the vehicle wheel and brake assembly of FIGURE 1, taken in the direction of arrows 2—2 of that figure, with parts broken away and in section.

Figure 1:
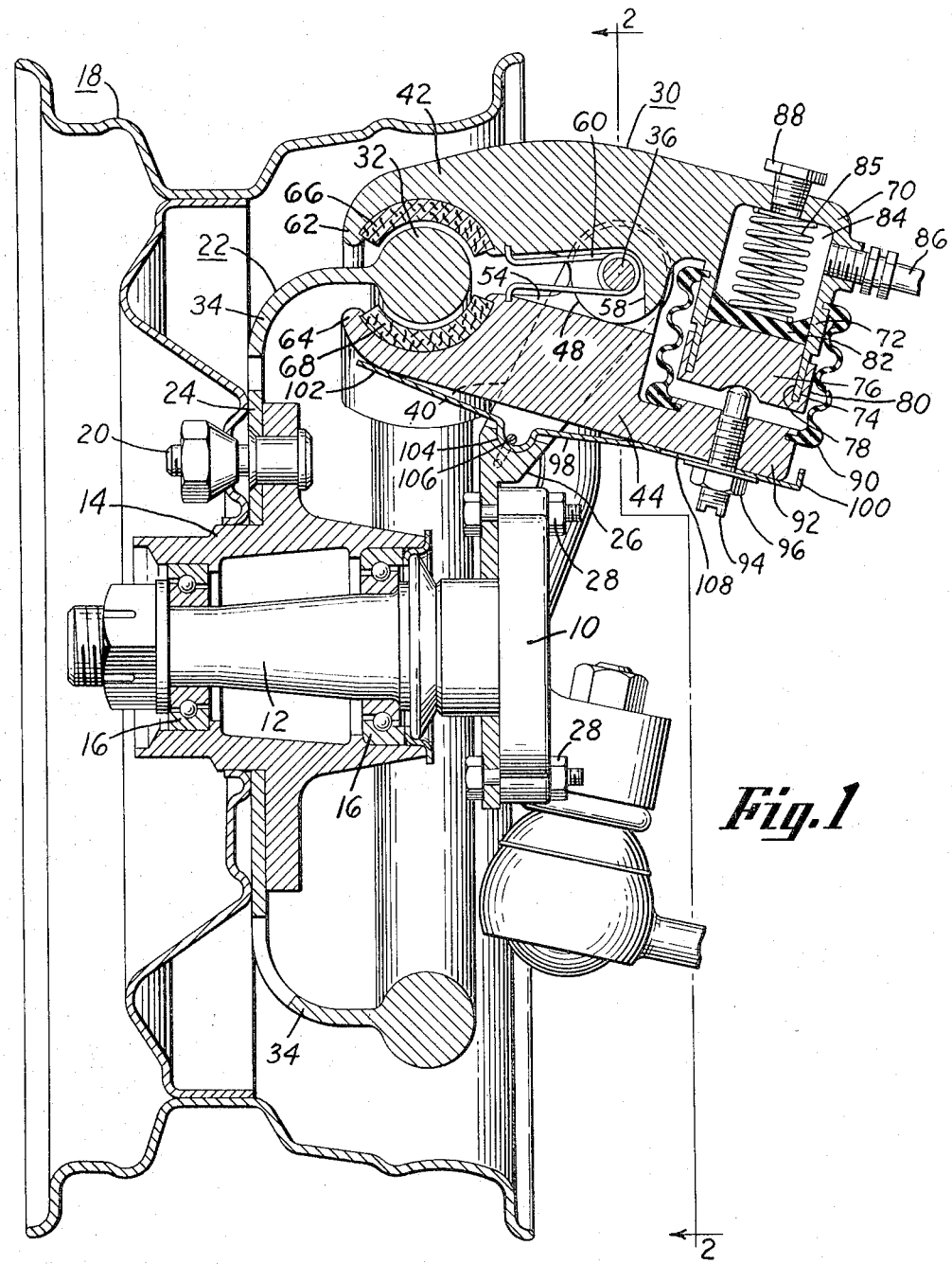
FIGURE 1 is a cross section view of a vehicle wheel and brake assembly embodying the invention, the view being taken in the direction of arrows 1—1 of FIGURE 2.

The assembly illustrated in the drawings is mounted on a front wheel of a vehicle. The wheel mounting arrangement includes the knuckle 10 which is provided with an axle 12. The wheel hub 14 is mounted on the axle on bearings 16. The wheel 18 is suitably secured to the hub by bolt and nut assemblies 20. A tire may be mounted on the rim of the wheel 18. The brake disc assembly 22 is suitably secured to the wheel hub 14 by its center mounting annulus 24. A brake caliper mounting yoke 26 is secured to the knuckle 10 by fastening assemblies 28. The brake caliper 30 is mounted on the yoke 26 in a manner to be described.

The disc assembly 22 has an annular friction braking surface section 32 which has a toroidal cross section. The friction braking section or member 32 is attached to the annulus 24 of the disc assembly by means of spokes 34. The spokes are circumferentially and radially swept for strength, noise suppression and heat dissipation. In some installations the spokes 34 may be replaced by a solid annular disc. The disc assembly 22 is preferably formed as one integral part, but may be made in several sections which are suitably secured together in a permanent manner. The toroidal friction braking member or ring 32 is preferably substantially circular in cross section in order to present the maximum friction braking surface consonant with the space occupied by the ring. The ring 32 is also preferably displaced axially from the mounting annulus section 24 so as to position it in the inner side of the wheel 18 at a point where a greater ring radius may be utilized.

The caliper assembly 30 is mounted on yoke 26 by a pivot pin 36 which extends through apertures formed in the spaced yoke arms 38 and 40. The caliper assembly 30 includes an outer jaw 42 and an inner jaw 44. As is best seen in FIGURE 2, the outer jaw is provided with spaced pivot mounting sections 46, 48 and 50, and the inner jaw is provided with spaced pivot mounting sections 52 and 54 which are interlaced with the outer jaw sections. All of the sections are provided with aligned apertures through which pin 36 extends. Suitable bearings or washers may be provided between the interlaced pivot mounting sections if desired as well as between the outer mounting sections and the adjacent yoke arms. Washers 56 are illustrated as being between the yoke arms and the outer jaw pivot mounting sections. The center pivot mounting section 48 of the outer jaw is slotted at 58 so as to receive the torsional type retraction spring 60. Spring 60 receives pivot pin 36 through the circular portion thereof and has its outer ends respectively engaging jaws 42 and 44 so that the spring urges the jaw ends 62 and 64 apart. Each jaw end 62 and 64 is provided with a friction pad, 66 and 68 respectively. The jaw ends 62 and 64 are shaped to conform to the toroidally curved surfaces of the friction ring 32, as are the friction pads 66 and 68. As illustrated in the drawings, each friction pad is engageable with a portion of the toroidal surface of ring 32. The outer jaw friction pad 66 is arranged to be engageable with the radial outer surface of ring 32 and the inner jaw friction pad 68 is arranged to be engaged with the inner radial surface of ring 32. When the jaw ends 62 and 64 are forcibly closed, in a manner to be described, friction pads 66 and 68 engage the toroidal surface areas of ring 32 enclosed by the jaw ends, and a friction braking force is obtained.

The jaw end 70 of the outer jaw 42, on the opposite side of the pivot pin 36 from the jaw end 62, is bored to provide a cylinder section 72. The outer end 74 of the cylinder section is an annular cylinder wall which forms a piston guide for the piston 76. The main body or center section of piston 76 is received within cylinder 72. The outer end of the piston extends radially outward of the end 74 of the cylinder section. An annular slot 78 is provided which receives the piston guide portion 74 formed by the outer end of cylinder 72. Thus the piston body includes an outer ring section 80. The piston therefore provides a cap for the cylinder. This construction also provides an abutment which prevents the piston from being forced upwardly into the cylinder by the adjusting mechanism due to over-adjustment. This establishes precise initial positioning and clearance between the ring 32 and the jaw ends 62 and 64. A cup seal 82 is positioned adjacent the inner end of piston 76 within cylinder 72 and cooperates with the cylinder to define the pressure chamber 84. A light piston spring 85 exerts a force which urges the cup seal against the piston and also urges the piston into continuous engagement with the thrust pin described below. The force of spring 85 therefore urges the jaws 42 and 44 in the same opposed pivotal directions as does pressurization of chamber 84. The level of the range of force exerted by spring 85 is substantially less than the level of force range exerted by spring 60 in the opposite jaw pivoting directions.

A fluid pressure conduit 86 communicates with pressure chamber 84 so that pressurized fluid can be introduced into the chamber to move piston 76 outwardly to actuate the brake assembly. A bleed plug 88 may be provided in the upper end of chamber 84 to bleed the brake system if the brakes are hydraulically actuated. A flexible boot 90 is secured to the outer side of cylinder 72 so that it covers the cylinder end 74 and the piston ring section 80. Boot 90 is also secured to the end 92 of inner jaw 44 which is adjacent the outer jaw end 70. An adjustable thrust pin 94 is threadably received in jaw end 92 and is locked in position by suitable means such as lock nut 96. Pin 94 engages piston 76 in a ball and socket arrangement to allow actuation of the caliper without a binding action. Another force exerting means in the form of a jaw centering spring 98 has one end 100 secured by pin 94 and lock nut 96 to the inner jaw end 92. The other spring end 102 is in free sliding engagement with the inner jaw end 64 on the side thereof opposite the friction pad 68. The center section 104 of spring 98 is pivotally held in position on the center portion of the mounting yoke 26 by the spring retainer 106. Spring center portion 104 is positioned so that the spring legs leading to the spring ends 100 and 102 form an angle somewhat less than 180°. The spring thus effectively provides a Y-shaped support for the caliper. The center section of the spring is substantially semi-circular in cross section and fits in a mating slot formed in yoke 26 so that the spring may pivot about the axis of its center section. The spring end 100 is slotted at 108 to provide adjustment of the spring in relation to inner jaw 44 so as to adjust the caliper assembly to a neutral position when it is not energized. This adjustment is made in the following manner. When the caliper assembly has been installed in position without tightening the lock nut 96, the thrust pin 94 is adjusted with the piston 76 in the fully retracted position until the desired total clearance between the friction pads 66 and 68 and the ring 32 is obtained. The caliper assembly will tend to pivot clockwise or counterclockwise about pivot pin 36 depending upon the weight distribution. If the pivotal action is clockwise, the friction pad 68 will move upwardly until it contacts the inner diameter of ring 36. The caliper is then moved counterclockwise, thus in effect sliding the spring end 100 to the left relative to jaw end 92 until the geometry and spring pressure of spring 98 exerts sufficient supporting force on inner jaw 44 to obtain the desired equality of clearance of the friction pads in relation to the ring 32. The lock nut 96 is then securely tightened while holding the thrust pin 94 in its previously adjusted position and total link-to-jaw clearance is established. The locking of the slotted spring end 100 in place assures a neutral position of the caliper assembly.

What is claimed is:

1. A vehicle disc brake assembly comprising a brake caliper having curved friction surface friction means and an annular member having a toroidal friction braking surface selectively engaged by said friction means, said friction means having a plurality of toroidally segmental friction surfaces and including opposed friction surfaces selectively and concurrently engaging said annular member on radially opposite sides of the toroidal friction braking surface along opposed cross sectioned arcs.

2. A disc brake disc comprising a friction braking section having a toroidal friction braking surface, an annular mounting section spaced radially inward and axially of said friction braking section, and a center member joining said mounting section radially outward thereof and joining said friction braking section axially of the disc, said center member including a plurality of circumferentially and radially swept spokes.

3. A brake caliper having a first jaw member and a second jaw member pivotally secured to each other intermediate the ends thereof and to a caliper mounting member on a single common axis, force exerting means between two adjacent jaw member ends, and toroidal segment friction pads mounted on the other two adjacent jaw member ends for braking engagement with a toroidal friction braking surface upon actuation of said force exerting means, and means adjustably establishing a neutral released position of said jaw members on said caliper mounting member in accordance with wear of said friction pads and required amount of actuation of said force exerting means.

4. A disc brake caliper having a pair of jaws pivoted on a common pivot support, and adjustable position spring means engaging one of said jaws on opposite sides of the pivot axis and mounted on said support and yieldably holding said jaws in a selected neutral position on said pivot support.

5. The caliper of claim 4, said jaws having means actuatable to clamp on a brake disc in friction braking relation by opposed pivotal movement of said jaws, and jaw retracting means acting on said jaws upon release of said clamp means and cooperating with said spring means to move said jaws to the selected neutral position.

6. In a brake caliper having first and second relatively movable braking members, a cylinder formed in one of said members and having an annular wall at the outer end thereof, a piston having a center section reciprocably received in said cylinder and an end section abutting the annular wall outer end and an outer section surrounding the annular wall outer end, said piston thereby providing a cylinder cap and said annular wall outer end providing a positive piston retraction positioning device in cooperation with said piston end section and further providing a piston guide having annular inner and outer piston guiding surfaces.

7. A brake assembly comprising mounting means having a member to be braked rotatably mounted thereon; a brake caliper having first and second jaw members pivotally mounted on each other and on said mounting means and friction surface means on said jaw members selectievly engageable with said member to be braked; said caliper further having power means when energized urging said jaw members in first opposite pivotal directions to engage said friction surface means with said member to be braked, first force exerting means continually acting to urge said jaw members in said first opposite pivotal directions at a first force range level, second force exerting means continually acting to urge said jaw members in second opposite pivotal directions to disengage said friction surface means and said member to be braked at a second force range level higher than said first force range level, third force exerting means acting on said jaw members to urge both jaw members in the same pivotal direction relative to said mounting means to a neutral position to maintain said friction surface means substantially equidistant from said member to be braked, and means including said third force exerting means adjusting said neutral position in accordance with the wear of said friction surface means to maintain a substantially constant adjustment of said friction surface means relative to said member to be braked.

8. The brake assembly of claim 7, said member to be braked including a friction braking section having a toroidal friction braking surface, an annular mounting section spaced radially inward and axially of said friction braking section, and a center section formed of a plurality of circumferentially and radially swept spokes joining said mounting section radially outward thereof and joining said friction braking section axially, the pivotal movement of said caliper jaw members being in a plane defined by a radius and the axis of said member to be braked.

9. The brake assembly of claim 7, said adjusting means including said third force exerting means comprising a cantilever spring centrally pivotally secured to said mounting means with opposite ends engaging one of said jaw members and respectively urging said jaw members in opposite pivotal directions, one of said ends having a free sliding engagement and the other having a frictionally restrictive sliding engagement permitting changes of effective length of said spring other end in accordance with required braking action pivotal movement of said one jaw member as determined by wear of said friction surface means to adjust said jaw members' neutral position on said mounting means.

10. The brake assembly of claim 7, said power means being a piston and cylinder assembly wherein the piston is guided interiorly and exteriorly of the cylinder to provide a cylinder cap and a stop abutment precisely establishing the full retraction position of the piston from which the brake is actuated and from which said adjusting means adjustments are made.

References Cited by the Examiner

UNITED STATES PATENTS 2,307,663　1/1943　Bernhardt _____ 188—73 X

FOREIGN PATENTS 518,408　11/1955　Canada.
497,505　9/1919　France.

DUANE A. REGER, *Primary Examiner.*